United States Patent Office 3,406,057
Patented Oct. 15, 1968

3,406,057

FERROMAGNETIC MATERIAL

Hozumi Hirota, Osaka-fu, and Akira Yanase, Miyagi-ken, Japan, assignors to Matsushita Electric Industrial Co., Ltd., Osaka, Japan

No Drawing. Filed Mar. 25, 1966, Ser. No. 537,268
Claims priority, application Japan, Mar. 26, 1965, 40/17,950
6 Claims. (Cl. 75—123)

This invention relates to new ferromagnetic material and more particularly to ferromagnetic material characterized by high mechanical hardness, high permeability and impressive saturation magnetization.

A per se well known soft magnetic material in an oxide form usually comprises ferrite, consisting of iron oxide, divalent metal oxides and other additive oxides. Famous iron alloys known as soft ferromagnetic materials are alloys of iron-nickel, iron-aluminum, and iron-aluminum-silicon which are commercially called "Permalloy," "Alperm" and "Sendust," respectively. The said soft magnetic materials are not entirely satisfactory from the standpoint of mechanical hardness. Recent development in the electronic industry has required a soft magnetic material having high mechanical hardness. Such material is especially desirable for use in the head chip of a video tape recorder. For practical application, such soft magnetic material is also required to have a high Curie temperature. A Curie temperature below room temperature (about 20° to 30° C.) greatly restricts practical application.

It is an object of this invention to provide magnetic material having high mechanical hardness, high magnetic permeability, a high Curie temperature and impressive saturation magnetization.

The present invention is based on the finding that the material defined by the chemical formula $$Co_{21}Sn_2B_6$$

is a ferromagnetic material having the Curie temperature of 152° C. (J. Phys. Soc. Japan, vol. 20, No. 10, 1965). According to the present invention, $Co_{21}Sn_2B_6$ can form a new composition $$Co_{21-x}Fe_xSn_2B_6$$

by a partial replacement of Co by Fe while maintaining the original cubic structure. The thus-obtained material $Co_{21-x}Fe_xSn_2B_6$ has a face-centered-cubic structure belonging to space group $$O_h^5Fm3m$$

i.e., a $Cr_{23}C_6$ type of structure.

The atom arrangement of the crystal of $Co_{21}Sn_2B_6$ is as follows: Cobalt atoms occupy point position *a*, *f* and *h* of Fm3m, tin atoms occupy point positions *c* of Fm3m and boron atoms occupy point positions *e* of Fm3m (Stadelmaier et al., Metall., 1962, vol. 16, pp. 773 and 1229).

The crystal phase of the new material $Co_{21-x}Fe_xSn_2B_6$ is a single phase of the $Cr_{23}C_6$ type of structure in a range of *x* lower than about 14.7. When the substituted amount *x* is higher than 14.7, the obtained material results in two phases of a $Cr_{23}C_6$ type and another phase. The coexistence of the latter phase impairs the desirable magnetic permeability of the novel compositions.

TABLE 1

| Composition of $Co_{21-x}Fe_xSn_2B_6$ | | Saturation magnetization (e.m.u./g.) at room temp. | Curie point (° C.) | Permeability (at 3 kc./s.) | Saturation magneto striction $10_6$. λs | Vickers' hardness (kg./mm.²) |
|---|---|---|---|---|---|---|
| x | Atomic Percent of Fe | | | | | |
| 0 | 0 | 43.2 | 152 | 17 | 6 | 1,000 |
| 2.10 | 7.2 | 62.0 | 260 | 36 | 7 | |
| 3.36 | 11.6 | 74.0 | 318 | 92 | | |
| 4.20 | 14.5 | 81.7 | 356 | 230 | 7 | 1,100 |
| 5.46 | 18.8 | 94.0 | 394 | 165 | | |
| 6.30 | 21.7 | 102.7 | 430 | 136 | 8 | 1,100 |
| 7.14 | 24.7 | 108.0 | 434 | 130 | | |
| 7.98 | 27.6 | 110.0 | 442 | 126 | 9 | |
| 8.40 | 29.0 | 110.0 | 444 | 68 | 12 | |
| 10.50 | 36.2 | 115.0 | 459 | 40 | 21 | |
| 12.60 | 43.4 | 118.0 | 471 | 30 | | |

Referring to Table 1 which shows the magnetic properties of $Co_{21-x}Fe_xSn_2B_6$, the magnetization and the Curie temperature increase rapidly with increasing *x* up to about 8, then they increase more gradually with further increase in *x*. The magnetic permeability increases in the composition range of $x=0$ to $x=4.20$ and decreases with further increasing amount of substituted iron. Table 1 establishes that the preferable compositions are those between $x=3.36$ and $x=5.46$. The last column of Table 1 indicates the Vickers' hardness of the novel compositions determined by melting at about 1300° C. in air at a pressure of $10^{-3}$ mm. Hg. The hardness of the novel material, 1100, is much higher than that of the conventional soft magnetic materials of Permalloy, Alperm and Sendust, i.e., ca. 500 or less.

The new material $Co_{21-x}Fe_xSn_2B_6$ exists in a $Cr_{23}C_6$ type structure and does not suffer impairment of the magnetic properties even when the amounts of tin atoms and boron atoms deviate slightly from the strictly stoichiometric proportions. A large deviation of both tin atoms and boron atoms, however, results in impairment of magnetic properties. Suitable atomic percentages are 6.3 to 7.3 atomic percent of tin and 20.6 to 23.2 atomic percent of boron.

Consideration of Table 1 and of deviation of atomic percentages of boron and tin shows that the operable compositions are 0 to 28 atomic percent of iron,
6.3 to 7.3 atomic percent of tin,
20.6 to 23.2 atomic percent of boron, and the balance cobalt.

Preferable compositions are 11.6 to 27.6 atomic percent of iron,
6.3 to 7.3 atomic percent of tin,
20.6 to 23.2 atomic percent of boron, and the balance cobalt and still more preferable compositions in view of magnetic permeability are 11.6 to 18.8 atomic percent of iron, 6.3 to 7.3 atomic percent of tin, 20.6 to 23.2 atomic percent of boron, and the balance cobalt.

The novel material of this invention can be prepared by a per se well known metallurgy technique by using either the sintering method or the melting method. Starting materials are high purity cobalt, tin, boron and iron, all in powder form. Commercially available powders may be used. Intimate mixtures of the constituents in desired proportions are made by using a usual agate mortar. The mixtures are pressed into desired shape at a pressure higher than 500 kg./cm.². The higher pressure is preferable for obtaining higher density of pressed product. The pressed product is then sintered at 800° C. to 1000° C. for 1 to 200 hours in an atmosphere (air) at a reduced pressure ranging from $10^{-2}$ mm. Hg to $10^{-6}$ mm. Hg or in a non-oxidizing atmosphere such as argon. No special cooling process is required for producing satisfactory magnetic properties. This is also a great feature of the novel material when compared with conventional magnetic material such as Sendust or Permalloy, which require a special cooling process. Either high or low rate of cooling produces similarly satisfactory magnetic properties in accordance with the present invention.

Porosity of the sintered material can be controlled by adjusting pressing pressure, sintering temperature, sintering time or their combinations in a way similar to the per se well-known powder metallurgy techniques.

The melting method can be performed as follows: A mixture of constituent granules of about 3 mm. diameter is weighed out in a desired proportion. A relatively coarse granule is preferable for the melting method. The mixture, in a refractory crucible such as alumina, is heated to 1300 to 1400° C. for 10 to 30 minutes and then cooled at any cooling rate.

Measurement of magnetic permeability was made with a sintered ring in a desired composition prepared by pressing at 500 kg./cm.², firing at 800° C. for 200 hours in air at a pressure of $10^{-3}$ mm. Hg. The ring, having an 11.7 mm. outer diameter, 7.6 mm. inner diameter and about 2 mm. thickness, was provided with Litz wire at 60 turnings for the purpose of measuring magnetic permeability in the per se usual manner.

The following examples of specific new compositions are given by way of illustration and should not be construed as limitative.

EXAMPLE 1

A mixture consisting of

| | Atomic percent |
|---|---|
| Cobalt | 56.24 |
| Iron | 14.06 |
| Tin | 6.70 |
| Boron | 23.0 |

is sintered by the method described above. Powder X-ray diffraction lines of the specimen are exactly indexed as a face-centered-cubic lattice of the $Cr_{23}C_6$ type. The specimen is in an atomic proportion indicated by the formula:

$$Co_{16.8}Fe_{4.20}Sn_2B_{6.87}$$

An effective permeability of this composition is 213 at a frequency of 3 kc./s.

EXAMPLE 2

As a further example, a specimen having the atomic proportion $$Co_{16.8}Fe_{4.20}Sn_{2.03}B_6$$

is obtained by sintering a pressed mixture consisting of

| | Atomic percent |
|---|---|
| Cobalt | 57.87 |
| Iron | 14.47 |
| Tin | 6.99 |
| Boron | 20.67 |

in exactly the same way as that above described. This specimen clearly exists in a single phase of the $Cr_{23}C_6$ type, and the effective permeability is 208 at 3 kc./s.

EXAMPLE 3

By way of further examples, samples of $$Co_{16.8}Fe_{4.2}Sn_{2.02}B_{6.35}$$

are prepared in exactly the same way as that hereinbefore described. It is thus found, that $Co_{16.8}Fe_{4.2}Sn_{2.02}B_{6.35}$ exhibits essentially the same magnetic properties as those of $Co_{16.8}Fe_{4.2}Sn_2B_6$.

Changes may be made within the scope and spirit of the claims, and some of the improvements may be used without others.

We claim:

1. A ferromagnetic material with a $Cr_{23}C_6$ type of crystal structure comprising essentially not more than 50.7 atomic percent of iron, 6.3 to 7.3 atomic percent of tin, 20.6 to 23.2 atomic percent of boron, and the balance cobalt, said crystal structure having such an atom arrangement that point positions *a*, *f* and *h* of Fm3m are occupied by cobalt atoms and iron atoms, point position *c* of FM3m is occupied by tin atoms, and point position *e* of Fm3m is occupied by boron atoms.

2. A ferromagnetic composition as defined in claim 1 consisting essentially of:

| | Atomic percentage |
|---|---|
| Co | 45.0–60.8 |
| Fe | 11.6–27.6 |
| Sn | 6.3–7.3 |
| B | 20.6–23.2 |

3. A ferromagnetic composition as defined in claim 1 consisting essentially of:

| | Atomic percentage |
|---|---|
| Co | 53.7–60.8 |
| Fe | 11.6–18.8 |
| Sn | 6.3–7.3 |
| B | 20.6–23.2 |

4. A ferromagnetic composition according to claim 1 and having the following chemical formula $$Co_{16.8}Fe_{4.2}Sn_2B_{6.87}$$

5. A ferromagnetic composition according to claim 1 and having the following chemical formula $$Co_{16.8}Fe_{4.2}Sn_{2.03}B_6$$

6. A ferromagnetic composition according to claim 1 and having the following chemical formula $$Co_{16.8}Fe_{4.2}Sn_2B_6$$

References Cited

UNITED STATES PATENTS 3,206,338 9/1965 Miller et al. ------- 75—123 X

CHARLES N. LOVELL, *Primary Examiner.*